US011642946B2

(12) United States Patent
Toyota et al.

(10) Patent No.: US 11,642,946 B2
(45) Date of Patent: May 9, 2023

(54) VEHICLE DOOR

(71) Applicant: TOYOTA JIDOSHA KABUSHIKI KAISHA, Toyota (JP)

(72) Inventors: Masaru Toyota, Toyota (JP); Sho Tsumita, Seto (JP); Yoshiyuki Ryuno, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 50 days.

(21) Appl. No.: 17/376,778

(22) Filed: Jul. 15, 2021

(65) Prior Publication Data
US 2022/0063383 A1 Mar. 3, 2022

(30) Foreign Application Priority Data

Aug. 27, 2020 (JP) .............................. JP2020-143399

(51) Int. Cl.
*B60J 5/04* (2006.01)
*B60J 1/00* (2006.01)
*B60J 1/17* (2006.01)
*B60J 10/86* (2016.01)

(52) U.S. Cl.
CPC ............. B60J 5/0463 (2013.01); B60J 1/004 (2013.01); *B60J 1/17* (2013.01); *B60J 5/0415* (2013.01); *B60J 10/86* (2016.02)

(58) Field of Classification Search
CPC ... B60J 5/0463; B60J 1/004; B60J 1/17; B60J 5/0415; B60J 10/86

USPC ........................................................ 296/146.3
See application file for complete search history.

(56) References Cited

U.S. PATENT DOCUMENTS

| 6,966,601 | B2 * | 11/2005 | Matsumoto | ......... B60R 13/0237 |
| | | | | 49/490.1 |
| 9,242,537 | B2 * | 1/2016 | Yoshida | .................. B60R 13/04 |
| 2014/0117704 | A1 * | 5/2014 | Ide | ........................... B60J 10/75 |
| | | | | 296/146.2 |

FOREIGN PATENT DOCUMENTS

| JP | 2002-321526 A | 11/2002 |
| JP | 2007-030706 A | 2/2007 |
| JP | 2015-193275 A | 11/2015 |

* cited by examiner

Primary Examiner — Joseph D. Pape
Assistant Examiner — Dana D Ivey
(74) Attorney, Agent, or Firm — Sughrue Mion, PLLC

(57) ABSTRACT

A vehicle door includes a window and further includes window glass, an outer panel made of resin, and a belt molding. The outer panel is placed outwardly in the vehicle width direction from the window glass and faces the window glass in at least part of the peripheral edge of the opening. The belt molding is fixed to the inner surface of the outer panel facing the window glass and seals a gap between the window glass and the outer panel. The belt molding includes a base member and a belt molding body. The base member is bonded to the inner surface of the outer panel and has an attachment surface facing the window glass. The belt molding body is supported on the attachment surface of the base member via a plurality of fixed points provided such that the fixed points are distanced from each other.

11 Claims, 7 Drawing Sheets

VEHICLE DOOR

CROSS-REFERENCE TO RELATED APPLICATION

This application claims priority to Japanese Patent Application No. 2020-143399 filed on Aug. 27, 2020, incorporated herein by reference in its entirety.

BACKGROUND

1. Technical Field

The technology described in the present specification relates to a vehicle door.

2. Description of Related Art

A small one-passenger vehicle is described in Japanese Unexamined Patent Application Publication No. 2007-30706 (JP 2007-30706 A). An outer panel of a door of the vehicle is made of synthetic resin, and hereby, a reduction in the weight of the vehicle is achieved.

Japanese Unexamined Patent Application Publication No. 2015-193275 (JP 2015-193275 A) describes a vehicle door including window glass, an outer panel made of sheet metal, and a belt molding. The belt molding is inserted into the upper end of the outer panel made of sheet metal from the upper side so as to seal a gap between the window glass and the outer panel. An end part of the belt molding is hooked on an end of the sheet metal constituting the outer panel, so that the belt molding is fixed to the outer panel made of sheet metal.

SUMMARY

The outer panel made of resin as described in JP 2007-30706 A has a rigidity lower than that of the outer panel made of sheet metal. On this account, when an end part of a belt molding is hooked on an end of the outer panel made of resin like the vehicle door described in JP 2015-193275 A, the end of the outer panel made of resin may deform, so that the belt molding may be detached from the outer panel. In view of this, it is conceivable that the belt molding is fixed by bonding to the inner surface of the outer panel made of resin. However, the belt molding is a member configured to seal a gap between the window glass and the outer panel. Accordingly, the belt molding easily deteriorates materially, and a decrease in function along with the deterioration is also relatively large. On this account, the belt molding often needs to be replaced earlier than the life of the vehicle (or the vehicle door). In order to replace the belt molding, it is necessary to detach the currently-attached deteriorated belt molding from the outer panel. At this time, when the belt molding is directly bonded to the inner surface of the outer panel, the outer panel made of resin may be deformed at the time when the belt molding is pulled off from the outer panel. The present specification relates to a vehicle door that employs an outer panel made of resin and provides a technology that enables replacement of a belt molding without deforming the outer panel.

The technology described in the present specification is embodied as a vehicle door including a window. The vehicle door includes window glass, an outer panel, and a belt molding. The window glass is configured to close an opening of the window. The outer panel is made of resin and placed outwardly in the vehicle width direction from the window glass. The outer panel is configured to face the window glass in at least part of the peripheral edge of the opening. The belt molding is fixed to the inner surface of the outer panel facing the window glass, and the belt molding is configured to seal a gap between the window glass and the outer panel. The belt molding includes: a base member bonded to the inner surface of the outer panel and having an attachment surface facing the window glass; and a belt molding body attached to the attachment surface of the base member. The belt molding body is configured to make contact with the outer surface of the window glass. The belt molding body is supported on the attachment surface of the base member via a plurality of fixed points provided such that the fixed points are distanced from each other. Here, to be "supported via a plurality of fixed points provided such that the fixed points are distanced from each other" indicates the following structure. That is, a part where the belt molding body is supported on the attachment surface is clearly separated from a part where the belt molding body is not supported on the attachment surface, and in the former part, the belt molding body is fixed to the attachment surface with a relatively small area. The shapes of the fixed points within a range where both members are actually fixed to each other are not limited in particular, and the shapes of the fixed points may be a spotted shape, a linear shape, or a planar shape.

In the vehicle door, the belt molding is constituted by the base member and the belt molding body. The base member is bonded to the outer panel made of resin. The belt molding body is fixed on the attachment surface of the base member via the fixed points distanced from each other. With such a configuration, in a stage where the vehicle is manufactured, the base member to which the belt molding body is assembled can be easily bonded to the outer panel by use of a double-stick tape, for example. When the belt molding body deteriorates, the deteriorated belt molding body can be easily detached, without deforming the outer panel, by dividing the belt molding body from the base member at the fixed points distanced from each other. A new belt molding body may be bonded to the attachment surface of the base member by use of a double-stick tape, for example. This is because, in general, re-replacement of the new belt molding body is not presumed to be required earlier than the life of the vehicle (or the vehicle door). Thus, with the technology described in the present specification, in a vehicle door that employs an outer panel made of resin, it is possible to replace a belt molding without deforming the outer panel made of resin.

Technical details described in the present specification and further improvements thereof are described in "DETAILED DESCRIPTION OF EMBODIMENTS."

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
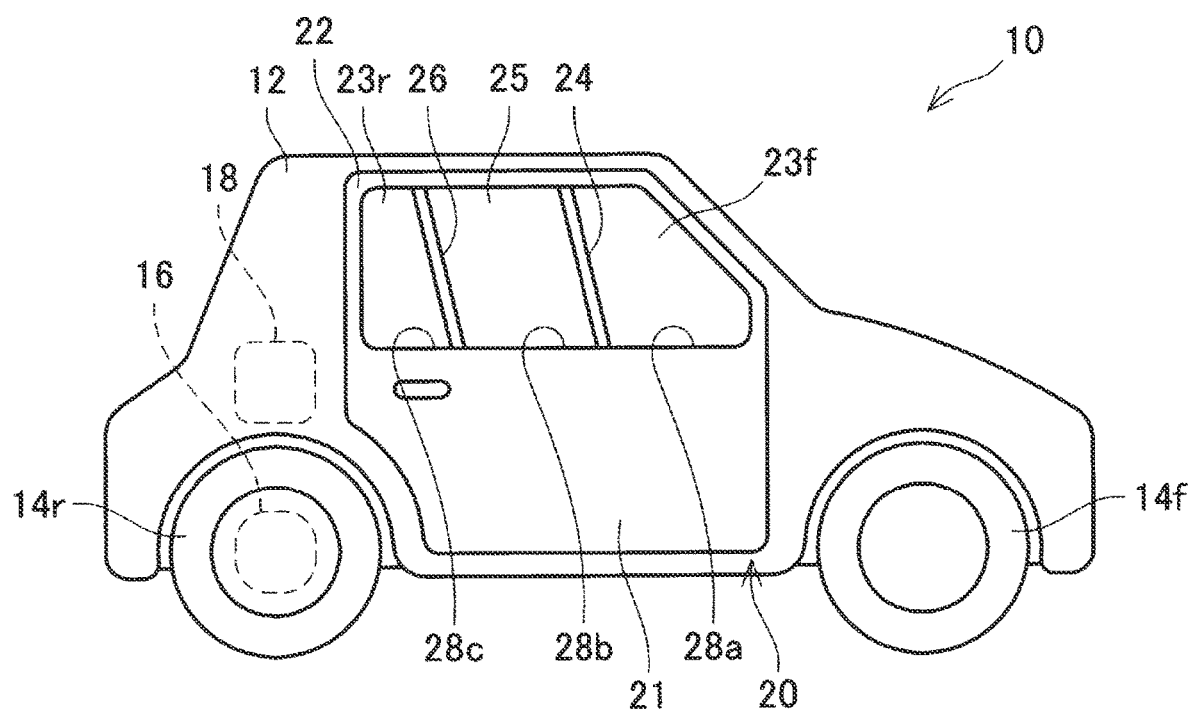
FIG. 1 is a right side view schematically illustrating a whole vehicle according to a first embodiment.
Figure 1:
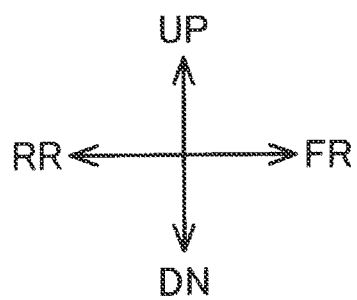

In one aspect of this technology, the window glass may be configured to be movable to an opening direction where the opening is to be opened and to a closing direction where the opening is to be closed. In this case, the belt molding may be placed on the opening-direction side relative to the opening and may slidably make contact with the outer surface of the window glass. In such a configuration, the belt molding easily deteriorates due to sliding with the window glass. Accordingly, the present technology that achieves easy replacement of the belt molding can be preferably employed. Note that, in other aspects, the belt molding may make contact with the outer surface of fixed window glass.

In one aspect of this technology, the base member may be bonded to the inner surface of the outer panel by a double-stick tape. Hereby, in a stage where the vehicle is manufactured, the belt molding can be relatively easily bonded to the inner surface of the outer panel.

In one aspect of this technology, the base member may include a plurality of bosses extending inwardly in the vehicle width direction from the attachment surface, the bosses being placed at respective positions corresponding to the fixed points. In this case, the belt molding body may have a plurality of holes such that the bosses are passed through the holes, respectively. With such a configuration, by use of the bosses of the base member and the holes of the belt molding body, the belt molding body can be relatively easily fixed to the base member.

In the above aspect, the bosses may be fitted within the holes at the fixed points. Hereby, the belt molding body can be hardly detached from the base member, and the belt molding body is stably fixed to the base member.

In the above aspect, each of the bosses may include a diameter-increased portion having a diameter larger than a diameter of a corresponding one of the holes, the diameter-increased portion being provided in a distal end of the each of the bosses. With such a configuration, the diameter-increased portion makes it possible to prevent the each of the bosses from coming out of its corresponding hole. That is, the belt molding body is firmly fixed to the base member.

In one aspect of this technology, the belt molding body may be welded to the base member at each of the fixed points. Hereby, the belt molding body can be hardly detached from the base member.

In one aspect of this technology, the base member may include a rim abutting with the upper end or lower end of the belt molding body in the vehicle up-down direction. Hereby, at the time when a new belt molding body is attached to the base member, the position of the belt molding body can be hardly displaced from the base member.

In one aspect of this technology, the base member may be made of a material having a rigidity higher than the rigidity of a material constituting the belt molding body. Hereby, the outer surface of the outer panel can hardly deform at the time when the deteriorated belt molding body is detached from the base member.

In the above aspect, the base member may be made of a resin material, and the belt molding body may be made of a rubber material. The rubber material is one of materials having an appropriate elasticity to seal a gap between the window glass and the outer panel. The rubber material may be natural rubber or synthetic rubber. Note that the rubber material used herein includes a material called elastomer.

With reference to the drawings, a vehicle door according to a first embodiment will be described. First, with reference to FIG. 1, a vehicle 10 provided with a door 20 according to a first embodiment will be described. The vehicle 10 is a so-called automobile and is a vehicle traveling on a road surface. Here, a direction FR in the drawings indicates the front side in the front-rear direction (the longitudinal direction) of the vehicle 10, and a direction RR indicates the rear side in the front-rear direction of the vehicle 10. Further, a direction LH indicates the left side in the right-left direction (the width direction) of the vehicle 10, and a direction RH indicates the right side in the right-left direction of the vehicle 10. A direction UP indicates the upper side in the up-down direction (the height direction) of the vehicle 10, and a direction DN indicates the lower side in the up-down direction of the vehicle 10. Note that, in the present specification, the front-rear direction, the right-left direction, and the up-down direction of the vehicle 10 may be just referred to as the front-rear direction, the right-left direction, and the up-down direction.

As illustrated in FIG. 1, the vehicle 10 includes a vehicle body 12 and a plurality of wheels 14*f*, 14*r*. The vehicle body 12 is not limited in particular, but the vehicle body 12 is formed by use of a metallic material and a resin material. The wheels 14*f*, 14*r* are rotatably attached to the vehicle body 12. The wheels 14*f*, 14*r* include a pair of front wheels 14*f* and a pair of rear wheels 14*r*. Note that the number of the wheels 14*f*, 14*r* is not limited to four. The vehicle 10 in the present embodiment has a small size for one occupant, but the size of the vehicle 10 and the number of occupants are also not limited in particular.

The vehicle 10 further includes a drive motor 16 and a battery unit 18. The drive motor 16 is connected to the rear wheels 14*r*, so that the drive motor 16 can drive the rear wheels 14*r*. Note that the drive motor 16 is not limited to driving the rear wheels 14*r*, provided that the drive motor 16 is configured to drive at least one of the wheels 14*f*, 14*r*. The battery unit 18 is connected to the drive motor 16 via a power supply circuit (not shown), so that the battery unit 18 supplies electric power to the drive motor 16. A plurality of secondary battery cells is incorporated in the battery unit 18, so that the battery unit 18 is chargeable repeatedly by electric power received from outside. Note that the vehicle 10 may include other power supplies such as a fuel cell unit or a solar panel in addition to or instead of the battery unit 18. Further, the vehicle 10 may include other motors such as an engine in addition to or instead of the drive motor 16.

The vehicle 10 further includes the door 20. The door 20 is placed on the right side of the vehicle body 12 and is provided openably and closably relative to the vehicle body 12. The door 20 is a vehicle door for a user to get in and out of the vehicle 10. The door 20 is attached to the vehicle body 12 via a hinge (not shown) and is configured to be swingable in the horizontal direction. The outer side of the door 20 in the vehicle width direction (that is, the near side on the plane of paper of FIG. 1) is covered with an outer panel 21, and a window frame 22 is provided on the upper side of the outer panel 21. The outer panel 21 is not limited in particularly, but the outer panel 21 is made of synthetic resin. When the outer panel 21 is made of synthetic resin, the vehicle 10 can be reduced in weight.

Two sash bars 24, 26 (a first sash bar 24 and a second sash bar 26) are provided inside the window frame 22. The two sash bars 24, 26 are provided in parallel to each other. The two sash bars 24, 26 extend to be inclined rearward toward the upper side. The window frame 22 and the two sash bars 24, 26 define three window openings 28a, 28b, 28c. Note that the position of the door 20 may be on the left side of the vehicle body 12. The position of the door 20 can be designed in accordance with regulations or the like of countries or districts.

The three window openings 28a, 28b, 28c include a first window opening 28a, a second window opening 28b, and a third window opening 28c. The first window opening 28a is placed most forward among the three window openings 28a, 28b, 28c and is surrounded by the window frame 22, the first sash bar 24, and the outer panel 21. First window glass 23f is provided in the first window opening 28a. That is, in the peripheral edge of the first window opening 28a, the first window glass 23f faces the window frame 22, the first sash bar 24, and the outer panel 21. The first window glass 23f is window glass that is not openable and closable, and the first window glass 23f is fixed to the window frame 22 and the first sash bar 24. The first window glass 23f closes the first window opening 28a.

The second window opening 28b is placed in the middle among the three window openings 28a, 28b, 28c and is surrounded by the window frame 22, the two sash bars 24, 26, and the outer panel 21. Second window glass 25 is provided in the second window opening 28b. That is, in the peripheral edge of the second window opening 28b, the second window glass 25 faces the window frame 22, the two sash bars 24, 26, and the outer panel 21. The second window glass 25 is window glass that is openable and closable. The second window glass 25 is attached movably along the two sash bars 24, 26. The second window glass 25 closes the second window opening 28b.

The third window opening 28c placed most rearward among the three window openings 28a, 28b, 28c is surrounded by the window frame 22, the second sash bar 26, and the outer panel 21. Third window glass 23r is provided in the third window opening 28c. That is, in the peripheral edge of the third window opening 28c, the third window glass 23r faces the window frame 22, the second sash bar 26, and the outer panel 21. The third window glass 23r is window glass that is not openable and closable, and the third window glass 23r is fixed to the window frame 22 and the second sash bar 26. The third window glass 23r closes the third window opening 28c. Here, each window glass 23f, 25, 23r is not limited to glass and may be constituted by other transparent or translucent materials such as acryl resin, for example.

Figure 2:
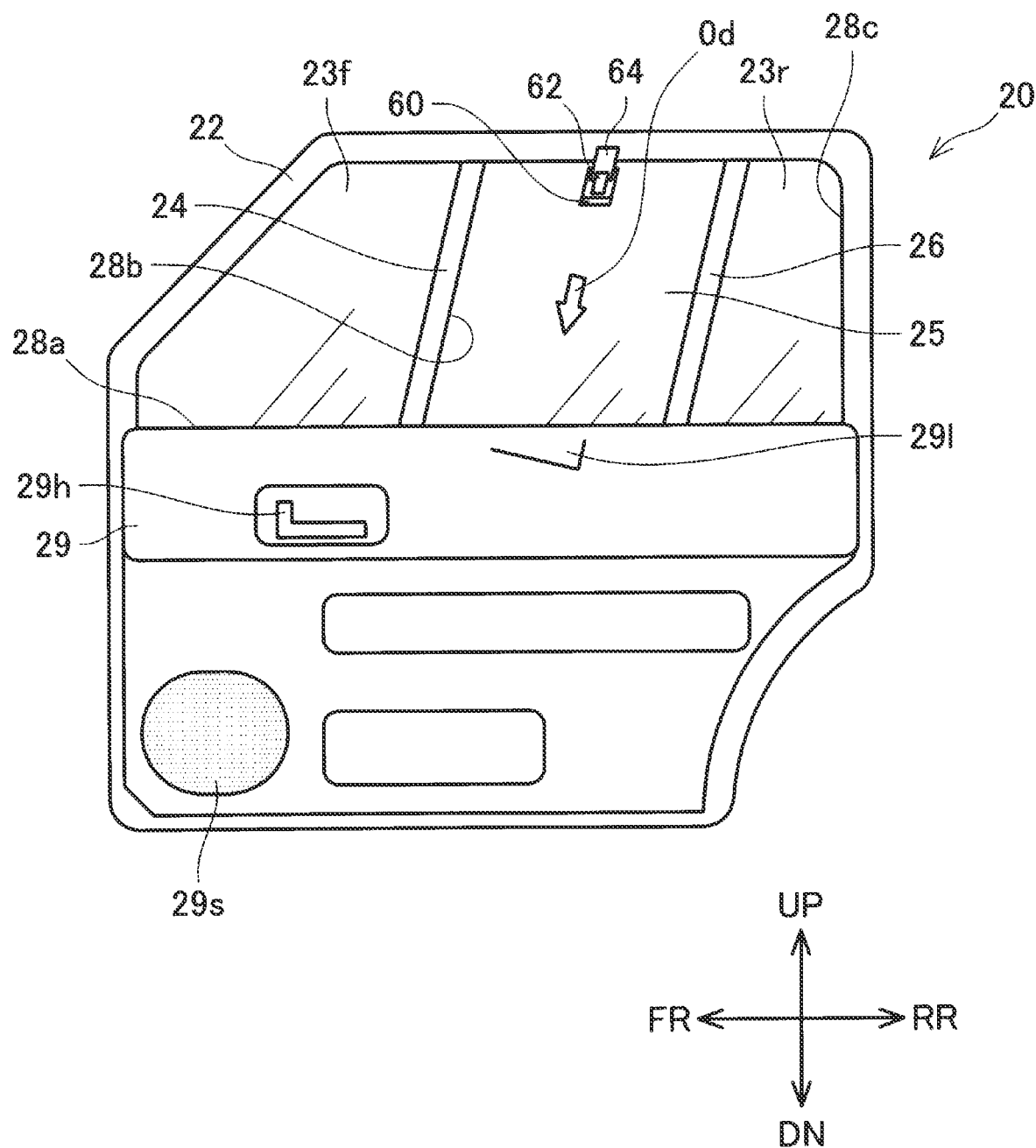
FIG. 2 is a front view of a door of the vehicle according to the first embodiment when the door is viewed from the inside of the vehicle and illustrates a state where window glass closes a window opening.
Figure 3:
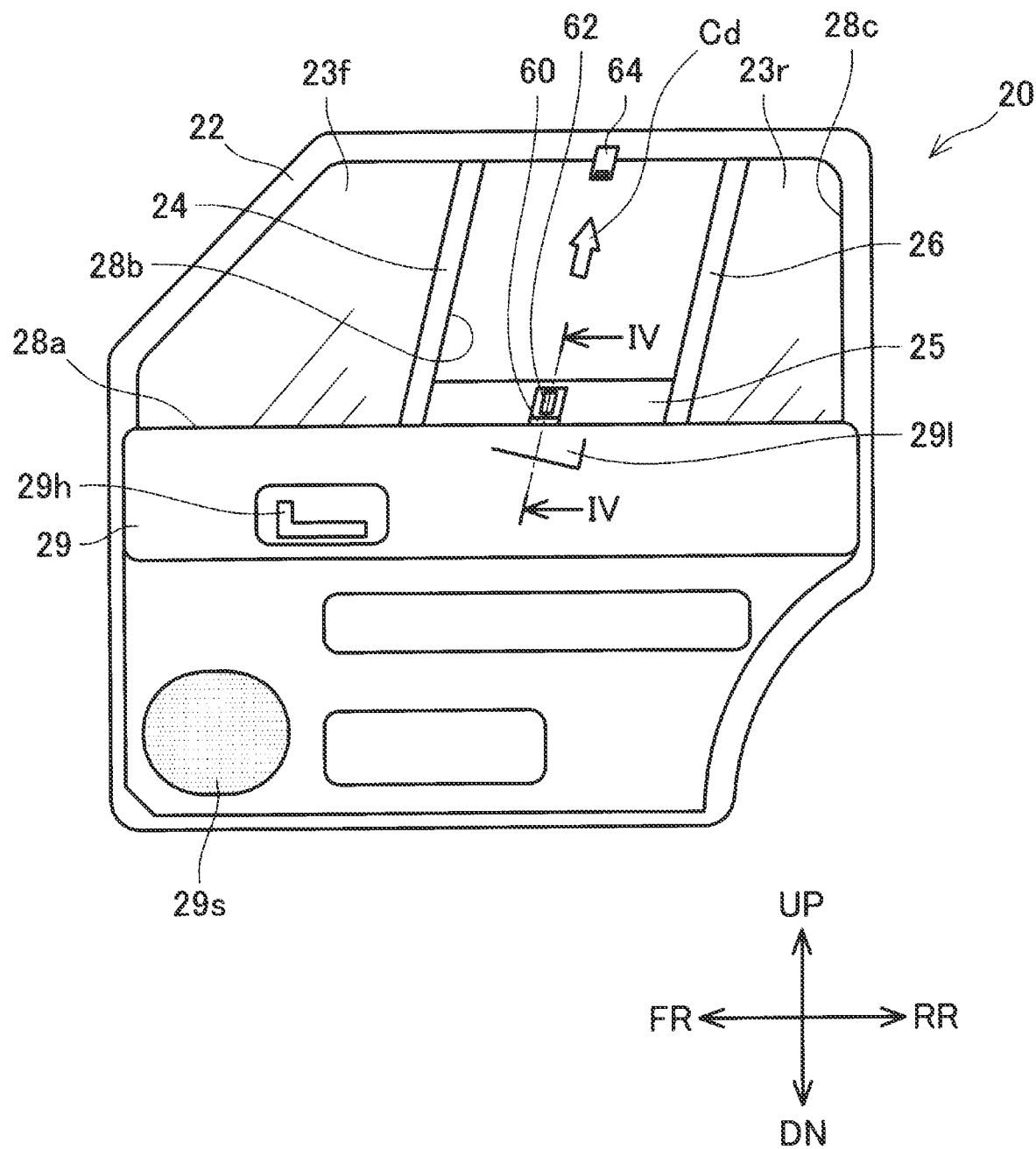
FIG. 3 is a front view of the door of the vehicle according to the first embodiment when the door is viewed from the inside of the vehicle and illustrates a state where the window glass opens the window opening.

FIGS. 2, 3 are front views of the door 20. That is, FIGS. 2, 3 illustrate the shape of the door 20 when the door 20 is viewed from the inside of a vehicle cabin along the right-left direction of the vehicle 10. As illustrated in FIGS. 2, 3, the second window glass 25 is operated directly by the user to move in the up-down direction between an upper limit position at which the second window glass 25 closes the second window opening 28b and a lower limit position at which the second window glass 25 opens the second window opening 28b. As illustrated in FIG. 2, when the second window glass 25 moves in an opening direction Od from the upper limit position of the second window glass 25, the second window opening 28b is opened. As illustrated in FIG. 3, when the second window glass 25 moves in a closing direction Cd from the lower limit position of the second window glass 25, the second window opening 28b is closed. The opposite ends of the second window glass 25 in the vehicle front-rear direction are slidably supported by the two sash bars 24, 26. The second window glass 25 moves in the vehicle up-down direction along the two sash bars 24, 26.

A knob 60 to be gripped by the user is provided in the second window glass 25. The knob 60 is attached to the inner surface of the second window glass 25 (that is, a surface thereof on the near side of the plane of paper of FIG. 2), and the knob 60 projects from the inner surface of the second window glass 25. The user can easily operate the second window glass 25 by use of the knob 60 from the inside of the vehicle cabin. That is, the user can raise the second window glass 25 by gripping the knob 60 or can lower the second window glass 25 by gripping the knob 60. That is, the second window glass 25 is operated in the up-down direction directly by the user without the use of a mechanism such as a conventional raising-lowering device, for example. Note that the second window glass 25 may be moved in the up-down direction by the conventional raising-lowering device.

The knob 60 is provided with a movable hook 62 to be operated by the user. Meanwhile, the window frame 22 is provided with a hook receiver 64 corresponding to the hook 62. When the second window glass 25 is placed at the upper limit position, the hook receiver 64 engages with the hook 62. Hereby, the second window glass 25 placed at the upper limit position is locked so that the second window glass 25 does not move down by deadweight, for example. Here, the positions of the knob 60, the hook 62, and the hook receiver 64 are not limited in particular. For example, the knob 60 and the hook 62 may be provided at different positions. Alternatively, the hook 62 may be provided in the window frame 22 while the hook receiver 64 may be provided in the second window glass 25.

As illustrated in FIGS. 2, 3, a door trim 29 is placed below the three window openings 28a, 28b, 28c. The door trim 29 includes an inside handle 29h and a speaker grille 29s. The door trim 29 is a component decorating the inner surface of the door 20. The door trim 29 improves the design property (that is, the outward appearance) of the door 20 viewed from the inside of the vehicle cabin by covering the inner side of the door 20. The door trim 29 is mainly made of resin. The inside handle 29h is a handle to be operated by the user so that the user opens the door 20 from inside the vehicle. The speaker grille 29s has a plurality of through-holes on its surface. Sound emitted from a speaker (not shown) housed inside the door 20 reaches the user inside the vehicle cabin through the speaker grille 29s.

When the second window glass 25 is moved in the opening direction Od such that the second window glass 25 is placed at the lower limit position, a space between the knob 60 and the door trim 29 becomes small as illustrated in FIG. 3. A recess 29l is provided in an upper part of the door trim 29. The knob 60 placed at the lower limit position faces the recess 29l.

Figure 4:
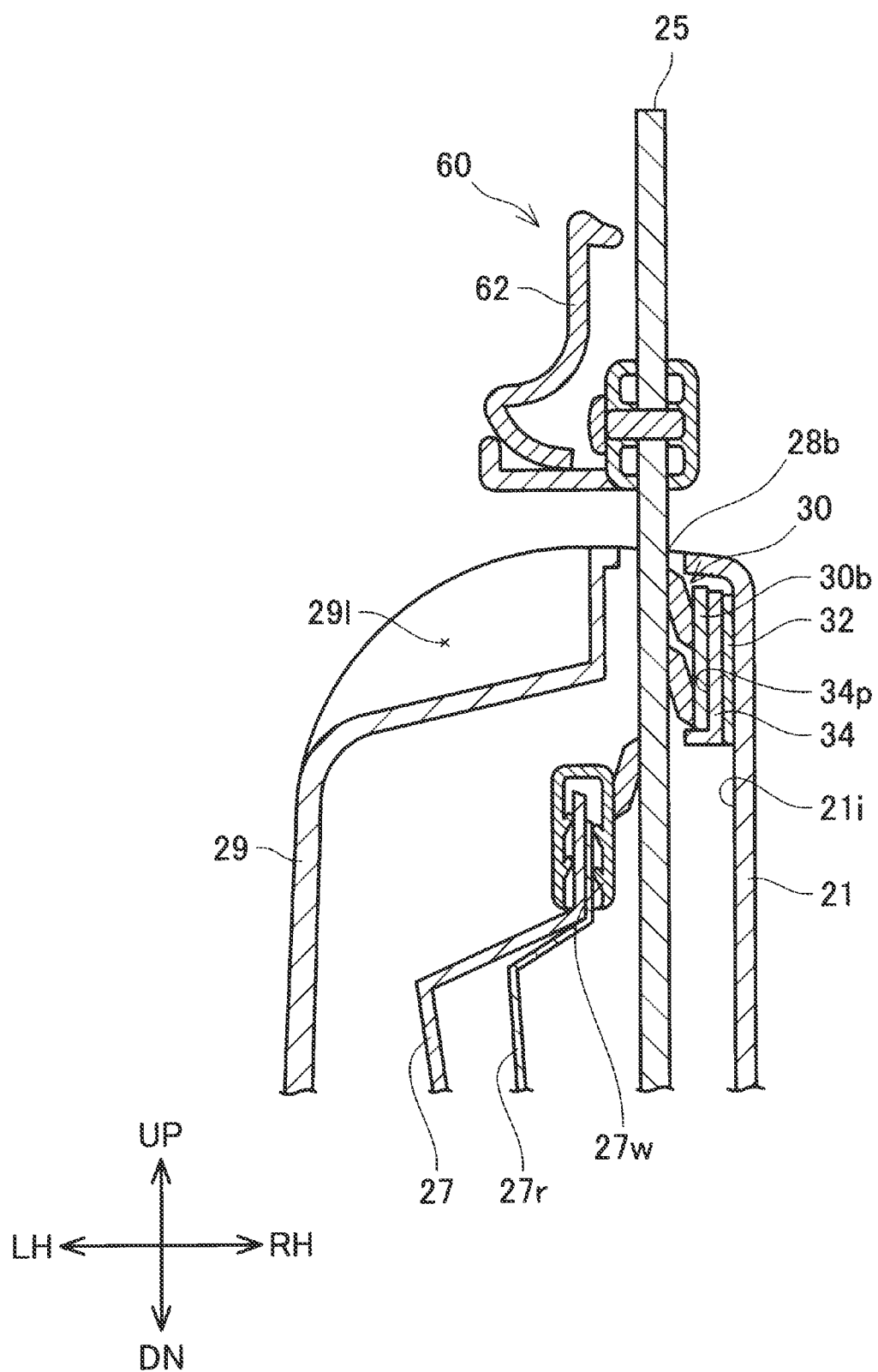
FIG. 4 is a sectional view taken along a line IV-IV in FIG. 3.

With reference to FIG. 4, the following describes a structure of an upper end part of the outer panel 21. FIG. 4 is a sectional view taken along a line IV-IV in FIG. 3. That is, FIG. 4 is a sectional view in the lower peripheral edge of the second window opening 28b. As described with reference to FIG. 2, the second window glass 25 is moved in the opening direction Od to open the second window opening 28*b*. That is, FIG. 4 is a sectional view in a peripheral edge of the second window opening 28*b* on the opening direction Od side.

The recess 29*l* is provided in the upper part of the door trim 29. The recess 29*l* forms a space that receives the hand of the user that operates the knob 60 between the recess 29*l* and the knob 60. Further, an inner panel 27, an inner reinforcement 27*r*, and an inner weather strip 27*w* are placed inside the door trim 29. The inner panel 27 is a sheet metal part provided on the inner side of the door 20 (see FIG. 2) in the vehicle width direction, and the door trim 29 is fixed to the inner panel 27. The inner reinforcement 27*r* is a sheet metal part configured to partially reinforce the inner panel 27. The inner weather strip 27*w* is fixed by being put to the upper ends of the inner panel 27 and the inner reinforcement 27*r*. The inner weather strip 27*w* seals a gap between the inner panel 27 and the inner surface of the second window glass 25.

An outer panel 21 is placed to the right side of the second window glass 25 (that is, the outer side of the second window glass 25 in the vehicle width direction). FIG. 4 is a sectional view in the peripheral edge of the second window opening 28*b* on the opening direction Od side as described earlier. The outer panel 21 faces the second window glass 25 in the peripheral edge of the second window opening 28*b* on the opening direction Od side. A belt molding 30 is placed in an upper end part of an inner surface 21*i* of the outer panel 21. The belt molding 30 is fixed to the inner surface 21*i* of the outer panel 21 by a double-stick tape 32. The belt molding 30 includes a base member 34 and a belt molding body 30*b*. The base member 34 is made of a resin material. The base member 34 has a flat shape extending in the up-down direction, and the bottom end of the base member 34 bends to the left side (that is, inwardly in the vehicle width direction). The right surface of the base member 34 (that is, the outer surface thereof in the vehicle width direction) is fixed to the inner surface 21*i* of the outer panel 21 by the double-stick tape 32. The left surface of the base member 34 (that is, the inner surface thereof in the vehicle width direction) is provided with an attachment surface 34*p* facing the outer surface of the second window glass 25. The belt molding body 30*b* is fixed to the attachment surface 34*p* of the base member 34. A detailed structure to fix the belt molding body 30*b* to the base member 34 will be described later. Note that the belt molding 30 extends in the front-rear direction with a uniform sectional shape along the upper end part of the outer panel 21. In the lower peripheral edge of the first window opening 28*a*, the belt molding 30 seals a gap between the outer surface of the first window glass 23*f* and the outer panel 21. In the lower peripheral edge of the third window opening 28*c*, the belt molding 30 seals a gap between the outer surface of the third window glass 23*r* and the outer panel 21. Similarly to the gap between the outer panel 21 and the second window glass 25 that is openable and closable, the belt molding 30 also seals the gap between the outer panel 21 and each of the first window glass 23*f* and the third window glass 23*r* that are not openable and closable.

The belt molding body 30*b* is typically made of a rubber material. As described earlier, the base member 34 is made of a resin material. That is, the base member 34 is made of a resin material having a rigidity higher than the rigidity of the rubber material constituting the belt molding body 30*b*. The belt molding body 30*b* includes two lips extending toward the outer surface of the second window glass 25. The two lips of the belt molding body 30*b* elastically deform by abutting with the outer surface of the second window glass 25 and seal the gap between the second window glass 25 and the outer panel 21. The rubber material may be natural rubber or synthetic rubber. Note that the rubber material used herein includes a material called elastomer. Flocking (not shown) is performed on respective surfaces of the lips of the belt molding body 30*b*. Flocked parts of the belt molding body 30*b* abut with the outer surface of the second window glass 25. When the flocked parts of the belt molding body 30*b* abut with the outer surface of the second window glass 25, a frictional force to be caused between the outer surface of the second window glass 25 and the belt molding body 30*b* is reduced. As a result, the second window glass 25 smoothly moves on the surfaces of the lips of the belt molding body 30*b*. Thus, the belt molding body 30*b* slidably makes contact with the outer surface of the second window glass 25.

Figure 5:
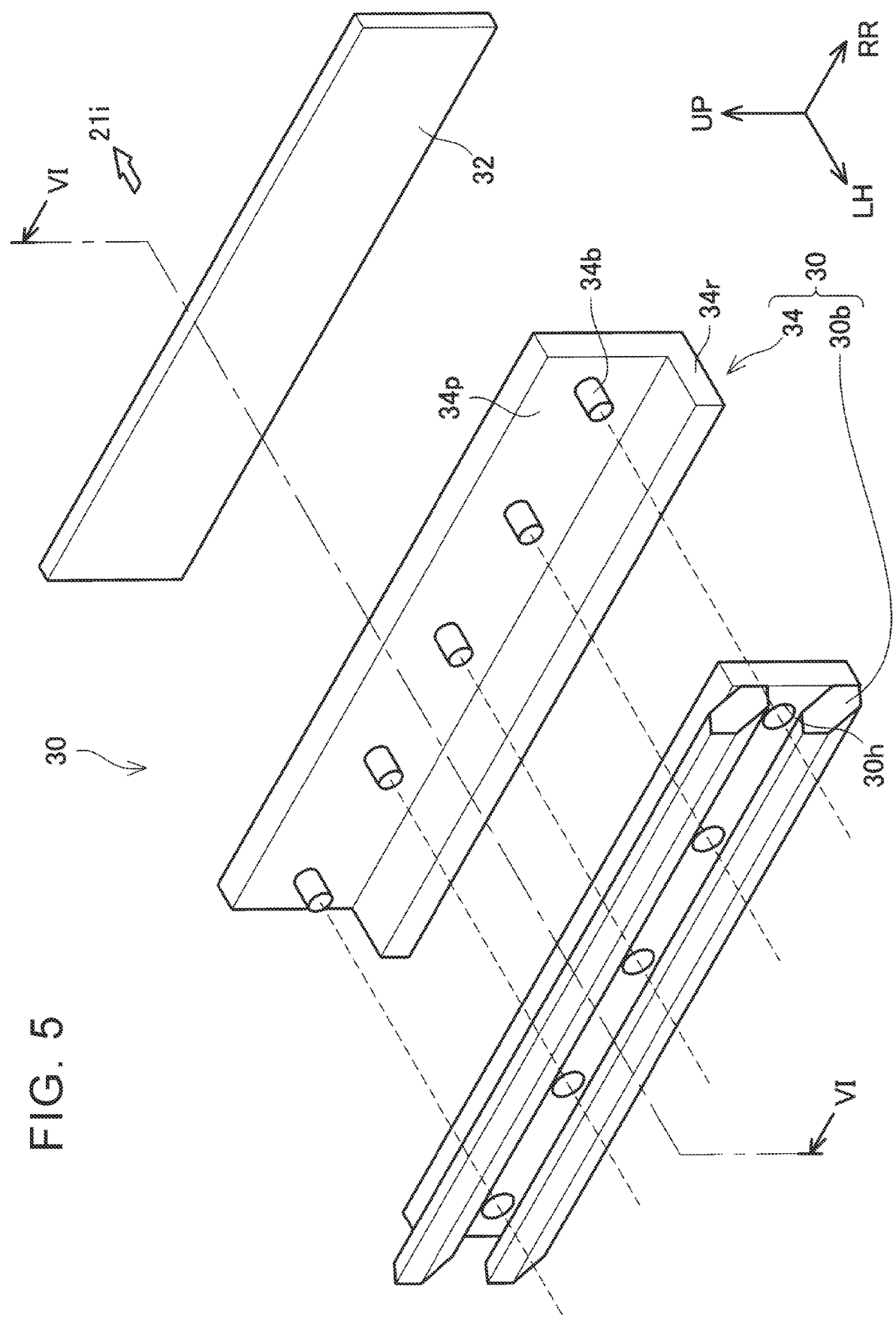
FIG. 5 is a perspective view of a belt molding in an exploded manner.
Figure 6:
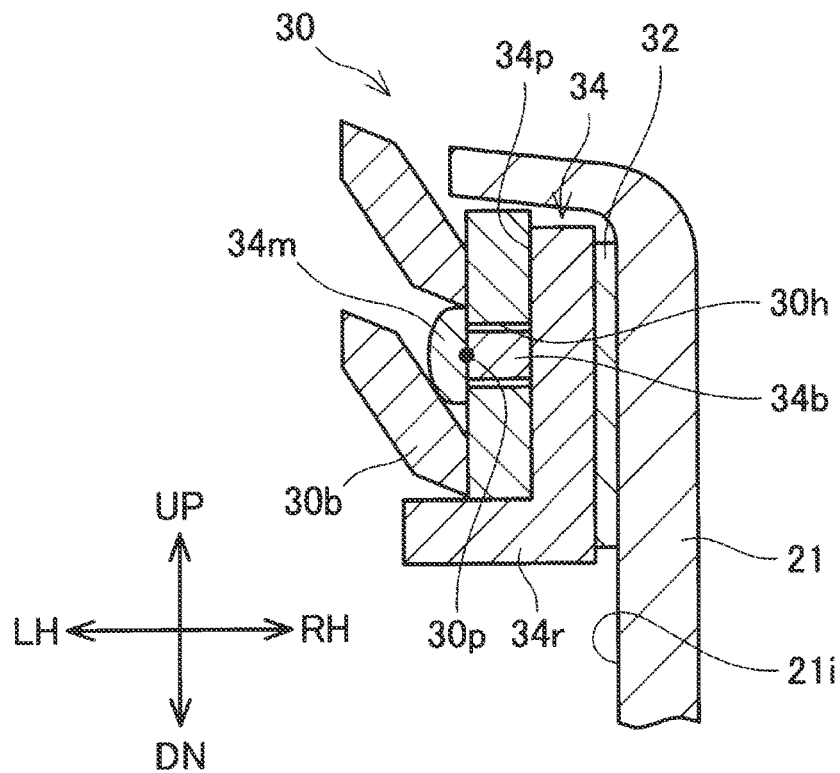
FIG. 6 is a sectional view taken along a line VI-VI in FIG. 5.

The detailed structure to fix the belt molding body 30*b* to the base member 34 will be described with reference to FIGS. 5, 6. FIG. 5 is a perspective view illustrating the belt molding body 30*b*, the base member 34, and the double-stick tape 32 in an exploded manner. As illustrated in FIG. 5, the base member 34 includes a plurality of bosses 34*b* provided such that the bosses 34*b* are distanced from each other and extend to the left side (that is, inwardly in the vehicle width direction) from the attachment surface 34*p*. The base member 34 includes a rim 34*r* extending in the front-rear direction. The rim 34*r* is provided in a lower end part of the base member 34. Further, the belt molding body 30*b* has a plurality of holes 30*h* such that the holes 30*h* are provided at respective positions facing the bosses 34*b* of the base member 34 and distanced from each other. As illustrated in FIG. 5, each of the bosses 34*b* of the base member 34 is inserted into its corresponding hole 30*h* in the belt molding body 30*b*. As a result, each of the bosses 34*b* is passed through its corresponding hole 30*h*. Note that, in FIG. 5, a reference sign is assigned only to the boss 34*b* placed on the rightmost side (that is, the rear side in the vehicle front-rear direction) in FIG. 5 among the bosses 34*b*, and no reference sign is assigned to the other bosses 34*b*. Similarly, in FIG. 5, a reference sign is assigned only to the hole 30*h* placed on the rearmost side, and no reference sign is assigned to the other holes 30*h*.

After the boss 34*b* of the base member 34 is passed through the hole 30*h* of the belt molding body 30*b*, the distal end of the boss 34*b* is melted from the left side by use of an ultrasonic wave jig (not shown). Hereby, as illustrated in FIG. 6, the height of the boss 34*b* is reduced while the diameter of the boss 34*b* is increased. As a result, a diameter-increased portion 34*m* is formed in the distal end of the boss 34*b*. The diameter of the diameter-increased portion 34*m* is larger than the diameter of the hole 30*h* of the belt molding body 30*b*. On this account, the belt molding body 30*b* is not detached from the base member 34. Note that, at the time when the distal end of the boss 34*b* is melted, the left surface of the belt molding body 30*b* may be or may not be melted together with the distal end of the boss 34*b* so as to be welded to the diameter-increased portion 30*m*. As illustrated in FIG. 6, the belt molding body 30*b* is fixed to the attachment surface 34*p* of the base member 34 such that the diameter-increased portion 34*m* of the boss 34*b* abuts with (or is welded to) a peripheral edge part of the hole 30*h*. The other parts of the belt molding body 30*b* are not fixed to the attachment surface 34*p*. That is, the belt molding body 30*b* is fixed to the attachment surface 34*p* with a relatively small area as an abutment part between the diameter-increased portion 34*m* of the boss 34*b* and the peripheral edge part of the hole 30*h*. That is, the belt molding body 30*b* is supported on the attachment surface 34p of the base member 34 via a fixed point 30p. In FIG. 6, the center of the abutment part between the diameter-increased portion 34m of the boss 34b and the peripheral edge part of the hole 30h is expressed as the fixed point 30p. As has been described with reference to FIG. 5, the base member 34 includes the bosses 34b distanced from each other, and the belt molding body 30b has the holes 30h corresponding to the bosses 34b distanced from each other. The belt molding body 30b is also supported by the bosses 34b and their corresponding holes 30h via the fixed points 30p. That is, the belt molding body 30b is supported on the attachment surface 34p via the fixed points 30p distanced from each other.

When respective distal ends of the bosses 34b are all melted, and the belt molding body 30b is fixed to the base member 34, the belt molding 30 is completed. As illustrated in FIGS. 5, 6, the belt molding 30 thus completed is bonded to the inner surface 21i of the outer panel 21 by the double-stick tape 32. Hereby, the belt molding 30 is fixed to the inner surface 21i of the outer panel 21 made of resin. Note that the belt molding 30 may be bonded to the inner surface 21i by an adhesive agent.

As has been described with reference to FIG. 4, the belt molding 30 seals the gap between the outer surface of the second window glass 25 and the outer panel 21. The sealing property of the belt molding 30 decreases along with deterioration of the belt molding 30. Particularly, the belt molding body 30b easily deteriorates materially and markedly decreases the sealing property of the belt molding 30 along with the deterioration. Since the belt molding body 30b is exposed to outside the vehicle, foreign materials such as rain water and dust attached to the outer surface of the second window glass 25 are easily attached to the belt molding body 30b. These foreign materials advance the deterioration of the belt molding body 30b. Further, deteriorations such as abrasion caused due to sliding of the second window glass 25 also occur in the belt molding body 30b. On this account, the belt molding body 30b is a member that easily deteriorates, and therefore, it can be presumed that the belt molding body 30b needs to be replaced earlier than the life of the vehicle 10 (or the vehicle door 20).

As described earlier, the belt molding body 30b is supported by the base member 34 via the fixed points 30p distanced from each other. Accordingly, at the time when the deteriorated belt molding body 30b is detached, the belt molding body 30b can be easily detached by cutting the diameter-increased portions 30m at the fixed points 30p. After that, the bosses 34b are cut from their bottoms, and the surface of the attachment surface 34p is smoothed off. A new belt molding body 30b is fixed by a double-stick tape to the attachment surface 34p from which the bosses 34b have been removed by cutting. Hereby, the belt molding body 30b can be easily replaced without deforming the outer surface of the outer panel 21. Note that, generally, re-replacement of the new belt molding body 30b is presumed to be required after the life of the vehicle 10 (or the door 20). On this account, a double-stick tape may be employed to fix the new belt molding body 30b. Further, as illustrated in FIG. 6, the lower end of the belt molding body 30b abuts with the upper surface of the rim 34r of the base member 34. Accordingly, at the time when the new belt molding body 30b is fixed to the attachment surface 34p from which the bosses 34b have been removed, the position of the belt molding body 30b can be hardly displaced. Note that the rim 34r may be formed in an upper end part of the base member 34, or respective rims 34r may be formed in opposite end parts of the base member 34 such that the rims 34r face each other via the belt molding body 30b.

Figure 7:
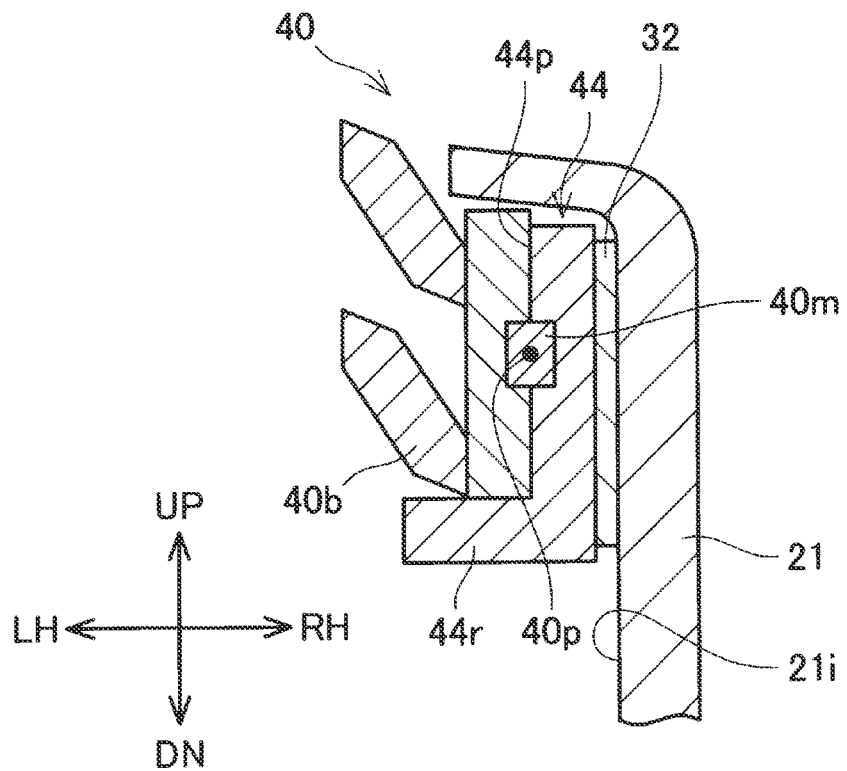
FIG. 7 is a sectional view similar to FIG. 6 in a second embodiment.

With reference to FIG. 7, the following describes a structure in which a belt molding body 40b of a belt molding 40 according to a second embodiment is supported on an attachment surface 44p of a base member 44. The base member 44 of the belt molding 40 according to the second embodiment does not include bosses on the attachment surface 44p. No hole is formed in the belt molding body 40b. In the second embodiment, the attachment surface 44p is directly welded to the right surface of the belt molding body 40b (that is, the outer surface thereof in the vehicle width direction). In the second embodiment, in a state where the attachment surface 44p is brought into contact with the belt molding body 40b, ultrasonic waves are applied to a central part between the attachment surface 44p and the belt molding body 40b from the opposite sides across the central part, so that the attachment surface 44p is welded to the belt molding body 40b. As a result, a mixture portion 40m is formed. In the mixture portion 40m, a resin material of the attachment surface 44p and a rubber material of the belt molding body 40b are mixed and solidified. The mixture portion 40m fixes the belt molding body 40b to the attachment surface 44p of the base member 44. That is, the belt molding body 40b is fixed to the attachment surface 44p with a relatively small area as the mixture portion 40m. That is, the belt molding body 40b is supported on the attachment surface 44p at a fixed point 40p. In FIG. 7, the center of the mixture portion 40m is expressed as the fixed point 40p. In the belt molding 40 of the second embodiment, the mixture portions 40m are formed at predetermined pitches along the front-rear direction of the belt molding 40. That is, the belt molding body 40b is supported on the attachment surface 44p of the base member 44 via the fixed points 40p distanced from each other. With such a configuration, when the belt molding body 40b deteriorates, the deteriorated belt molding body 40b can be easily detached by cutting the mixture portions 40m.

Figure 8:
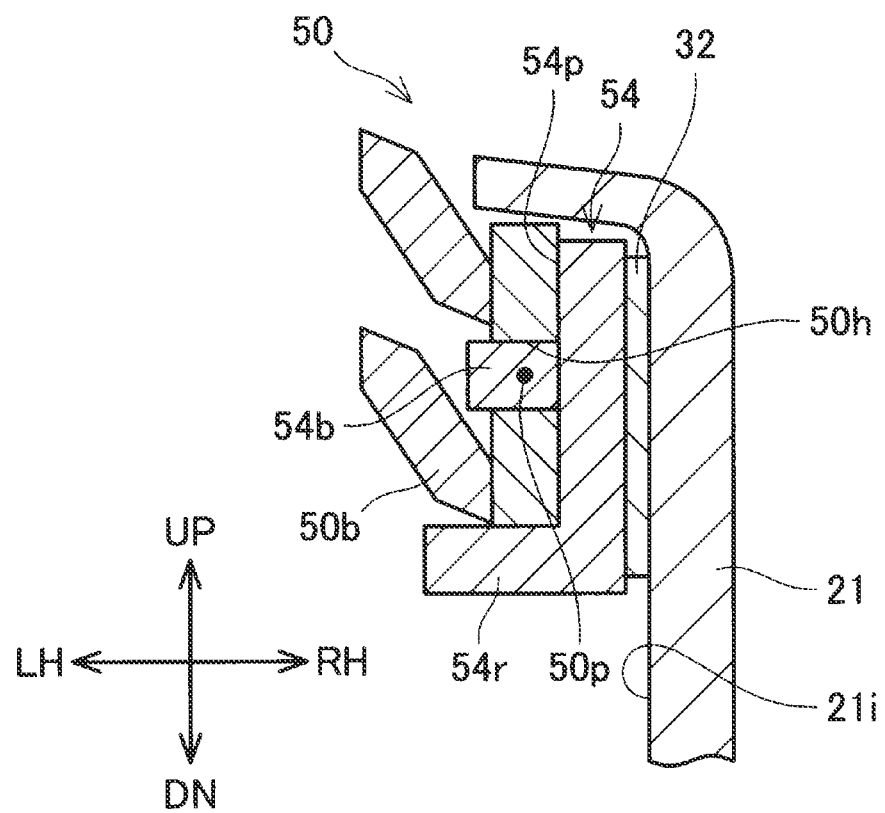
FIG. 8 is a sectional view similar to FIG. 6 in a third embodiment.

With reference to FIG. 8, the following describes a structure in which a belt molding body 50b of a belt molding 50 according to a third embodiment is supported on an attachment surface 54p of a base member 54. The base member 54 includes bosses 54b extending to the left side (that is, inwardly in the vehicle width direction) from the attachment surface 54p. The belt molding body 50b includes holes 50h through which the bosses 54b are passed. Differently from the first embodiment described with reference to FIG. 6, the diameter of the boss 54b according to the third embodiment is larger than the diameter of the hole 50h. Accordingly, when the boss 54b is fitted to the hole 50h by pressing, the boss 54b is fitted within the hole 50h. As a result, the belt molding body 50b is fixed to the attachment surface 54p of the base member 54. That is, the belt molding body 50b is fixed to the attachment surface 54p with a relatively small area as an abutment part between the side face of the boss 54b and the inner peripheral surface of the hole 50h. That is, the belt molding body 50b is supported on the attachment surface 54p of the base member 54 via a fixed point 50p. In FIG. 8, the center of a part where the boss 54b is fitted within the hole 50h is expressed as the fixed point 50p. Similarly to the belt molding 30 according to the first embodiment described with reference to FIG. 5, the belt molding 50 according to the third embodiment is also configured such that the bosses 54b distanced from each other are passed through their corresponding holes 50h, respectively. That is, the belt molding body 50b is supported on the attachment surface 54*p* via the fixed points 50*p* distanced from each other. With such a configuration, when the belt molding body 50*b* deteriorates, the deteriorated belt molding body 50*b* can be easily detached by cutting the bosses 54*b*. Note that the distal end of the boss 54*b* may be provided with a detent, and the belt molding body 50*b* may be supported on the attachment surface 54*p* such that the detent is fitted within the hole 50*h*.

The specific examples of the present disclosure have been described in detail. However, the examples are for illustration only, and do not limit the scope of the claims. The technology described in the scope of the claims includes the foregoing examples with various modifications and changes. Each of and various combinations of the technical elements described in this specification and the drawings achieve technical utility, and the technical elements are not limited to the combination stated in the claims at the time of filing. The technology described in this specification and the drawings as an example is able to achieve the plurality of objectives simultaneously and has technical utility by achieving one of the objectives.

What is claimed is:

1. A vehicle door including a window, the vehicle door comprising:
    window glass configured to close an opening of the window;
    an outer panel made of resin, the outer panel being placed outwardly in a vehicle width direction from the window glass, the outer panel being configured to face the window glass in at least part of a peripheral edge of the opening; and
    a belt molding fixed to an inner surface of the outer panel facing the window glass, the belt molding being configured to seal a gap between the window glass and the outer panel;
    wherein the belt molding includes:
        a base member bonded to the inner surface of the outer panel and having an attachment surface facing the window glass, and
        a belt molding body attached to the attachment surface of the base member, the belt molding body being configured to make contact with an outer surface of the window glass;
    wherein the belt molding body is supported on the attachment surface of the base member via a plurality of fixed points provided such that the fixed points are distanced from each other; and
    wherein the base member is bonded to the inner surface of the outer panel by a double-stick tape.

2. The vehicle door according to claim 1, wherein:
    the window glass is configured to be movable to an opening direction where the opening is to be opened and to a closing direction where the opening is to be closed; and
    the belt molding is placed on the opening-direction side relative to the opening and slidably makes contact with the outer surface of the window glass.

3. The vehicle door according to claim 1, wherein:
    the base member includes a plurality of bosses extending inwardly in the vehicle width direction from the attachment surface, the bosses being placed at respective positions corresponding to the fixed points; and
    the belt molding body has a plurality of holes such that the bosses are passed through the holes, respectively.

4. The vehicle door according to claim 3, wherein the bosses are fitted within the holes at the fixed points.

5. The vehicle door according to claim 3, wherein each of the bosses includes a diameter-increased portion having a diameter larger than a diameter of a corresponding one of the holes, the diameter-increased portion being provided in a distal end of the each of the bosses.

6. The vehicle door according to claim 1, wherein the belt molding body is welded to the base member at each of the fixed points.

7. The vehicle door according to claim 1, wherein the base member includes a rim abutting with an upper end or a lower end of the belt molding body in a vehicle up-down direction.

8. The vehicle door according to claim 1, wherein the base member is made of a material having a rigidity higher than a rigidity of a material constituting the belt molding body.

9. The vehicle door according to claim 8, wherein the base member is made of a resin material, and the belt molding body is made of a rubber material.

10. The vehicle door according to claim 1, wherein the double-stick tape attaches to the base member at a surface opposite to the attachment surface that faces away from the window glass.

11. The vehicle door according to claim 10, wherein the base member and the belt molding body are disposed entirely between the window glass and the outer panel.

* * * * *